Patented Feb. 22, 1949

2,462,146

UNITED STATES PATENT OFFICE 2,462,146

STABILIZATION OF INSOLUBLE SULFUR

Raymond H. Walcott, Cranford, and Alvin Schallis, Jersey City, N. J., assignors to Stauffer Chemical Company, a corporation of California No Drawing. Application December 3, 1945, Serial No. 632,606

9 Claims. (Cl. 23—224)

This invention relates to the treatment of sulphur containing an appreciable insoluble sulphur content to the end that the sulphur does not revert readily to the soluble form. The term "insoluble sulphur" or "sulphur mu" is usually applied to that sulphur fraction which is insoluble in carbon disulphide while the term "soluble sulphur" is applied to sulphur which is soluble in carbon disulphide. Sulphur containing from 30% to 100% of insoluble sulphur has several industrial uses, being employed in the manufacture of various natural and synthetic rubber products, as insecticides and the like. If prior to use, the sulphur is subject to an elevated atmospheric temperature, considerable reversion of the insoluble sulphur to that form of sulphur which is soluble in carbon disulphide may occur. Since the value of the material ordinarily depends on and is a function of the insoluble sulphur content, this reversion is undesirable, and represents an economic loss. If the reversion is substantial, the material may become totally unsuited to a given end use. It is therefore desirable that the material be treated to resist reversion.

We have found that if insoluble sulphur is subject to contact with materials usually recovered or resulting from the steam distillation or the destructive distillation of pine gum, pine wood and pine stumps such as turpentine, pine oil, pine tar or rosin, thereafter the rate of reversion of the sulphur to the soluble form is reduced very considerably. Even the vapors of these materials are effective and we have successfully stabilized insoluble sulphur against reversion by merely exposing it to the vapors given off by fresh pine wood for several days. The various components of turpentine, pine oil, pine tar and rosin, such as alpha pinene, beta pinene, dipentene, alpha terpineol and abietic acid, and derivatives of these such at the methyl ether of alpha terpineol are also useful as one would expect from the utility of their respective but more complex source materials; in this respect, the use of a relatively pure component of one of the aforementioned crude materials or a derivative of one of these, is the use of an equivalent material or of a material of a more highly refined nature and is therefore within our invention and the appended claims.

Our tests indicate that the oxidized forms of the terpene hydrocarbons, such as alpha terpineol and its methyl ether, terpenyl methyl ether, are somewhat more effective as compared to the hydrocarbons such as alpha pinene and we are of the opinion that the use of an oxygenated compound or the introduction of oxygen into the system to oxidize the hydrocarbon to an oxygenated form may be a necessary step in obtaining the effective stabilization observed. It is very difficult to exclude air from contact with the sulphur during drying and packing and storage and some exposure to atmospheric oxygen is unavoidable. Even in an inert gas system, such traces of oxygen are normally present as are sufficient to oxidize the small amounts of the stabilizer present with the sulphur. We are therefore unable to state precisely the role of oxygen in the mechanism of stabilization.

In the manufacture of insoluble sulphur it is usual to extract the soluble portion with a suitable solvent such as carbon disulphide, benzene or toluene and thereafter dry the remaining sulphur. A convenient manner of adding the stabilizer is to add it to the carbon disulphide-sulphur slurry just prior to the transfer of the insoluble sulphur to the filter. Thus, any difficulty in blending the light, fluffy, insoluble sulphur with the stabilizer is minimized. However, this method of application is not essential and almost any method for obtaining a reasonably fair mixture of the stabilizer with the insoluble sulphur can be employed. We have obtained satisfactory results by making a preliminary blend of the stabilizer and the insoluble sulphur in a ribbon mixer and then homogenizing this rough mix in a Mikro-Pulverizer. One can also effect stabilization by exposing the insoluble sulphur to the vapor of the stabilizer. This can be effected in the drying of the insoluble sulphur as it is freed of the solvent, the vapor being forced through, over and about the insoluble sulphur. Utilizing this procedure we have found that the reversion rate can be reduced to one-fifth or one-eighth that which ordinarily occurs during the drying operation.

We have found that if one incorporates even relatively small amounts of turpentine, pine oil, pine tar and rosin, or one or more of the relatively pure components of these, effective stabilization is secured. For example, terpin hydrate is effective in a concentration as low as 0.03% by weight, alpha pinene is highly effective in concentrations of 0.1% by weight and abietic acid at about 0.3% by weight, while alpha terpineol is approximately equally effective at all concentrations from 0.1% to 5%. We have used successfully concentrations between 0.01% and 50% by weight of the various materials.

To illustrate practice of the invention, a mass of sulphur containing 85.28% insoluble sulphur was divided into two lots. One was set aside as a control sample while to the other, 5% by weight of pine tar was added by dissolving the pine tar in a small quantity of carbon disulphide and adding this solution to the sulphur. The carbon disulphide-pine tar solution was thoroughly worked into the sulphur mass, the carbon disulphide being permitted to evaporate by exposing the sulphur in a layer to the air. The lots were then placed in the same constant temperature chamber at 95° F. for 78 days in open bags. The lots were then removed from the chamber in their bags and held in the same space for a period of thirty-one months at room temperature. At the end of this period, the insoluble sulphur content of each lot was determined. It was found at the end of the two test periods that a 3.48% loss had occurred from the untreated lot and only a 0.47% loss from the treated lot.

The fact that both of the above lots were in close proximity to one another during the two storage periods probably explains why a greater difference was not observed between these two; the pine tar vaporized from the stabilized lot probably affected the unstabilized lot, for usually the loss under such test condition is greater than that observed. A more indicative indication of the value of the materials which we have found useful in stabilizing sulphur mu against reversion to the carbon bisulphide soluble form is shown in the following table, wherein are shown the results obtained upon subjecting various lots of the same sulphur in separate closed containers to a temperature of 90° F. for one month, each lot differing from the other in preparation and composition only in that a different stabilizing material was employed. The concentration of the stabilizers was 0.1% by weight. The original insoluble sulphur content of sulphur employed was 89.30%.

| Stabilizing agent | Loss, percent by weight |
|---|---|
| Medium pine tar #1 | 0.5 |
| Heavy pine tar | 0.06 |
| Extra heavy pine tar | 0.13 |
| Medium pine tar #2 | 0.01 |
| Gum turpentine | 0.58 |
| Pine oil | 0.01 |
| Alpha pinene | 0.05 |
| Alpha terpineol | 0.36 |
| Abietic acid | 0.59 |
| None | 4.6 |

We claim:

1. A process of stabilizing insoluble sulphur against reversion to the form of sulphur which is soluble in carbon disulphide comprising dissolving a material selected from the group consisting of turpentine, pine oil, pine tar and rosin in a solvent therefor and mixing the resulting mixture into initially free-flowing and non-caking sulphur consisting predominantly of insoluble sulphur to uniformly distribute the mixture through the sulphur, said insoluble sulphur being insoluble in said solvent.

2. A process for stabilizing insoluble sulphur against reversion to the form of sulphur which is soluble in carbon disulphide comprising contacting initially free-flowing and non-caking sulphur consisting predominantly of insoluble sulphur with a material selected from the group consisting of turpentine, pine oil, pine tar and rosin in an amount and for a period sufficient to impart substantial heat reversion resistance to the insoluble sulphur.

3. A method of treating insoluble sulphur to stabilize same against reversion to that form of sulphur which is soluble in carbon disulphide comprising passing the vapor from a material selected from the group consisting of turpentine, pine oil, pine tar and rosin through a mass of initially free-flowing and non-caking sulphur consisting predominantly of insoluble sulphur for a time sufficient to impart an increased reversion resistance to the insoluble sulphur.

4. A process for reducing the rate of reversion of finely divided solid insoluble sulphur to the soluble form under the application to the insoluble sulphur of relatively elevated atmospheric temperatures, the process comprising substantially uniformly distributing through initially free-flowing and non-caking sulphur consisting predominantly of insoluble sulphur a material selected from the group consisting of turpentine, pine oil, pine tar and rosin in an amount from about 0.1% to about 50% of the weight of the insoluble sulphur.

5. A process for reducing the rate of reversion of finely divided solid insoluble sulphur to the soluble form under the application to the insoluble sulphur of relatively elevated atmospheric temperatures, the process comprising substantially uniformly distributing through initially free-flowing and non-caking sulphur consisting predominantly of insoluble sulphur a material selected from the group consisting of turpentine, pine oil, pine tar and rosin in an amount of only about 0.1% of the weight of the insoluble sulphur.

6. A process for reducing the rate of reversion of finely divided solid insoluble sulphur to the soluble form under the application to the insoluble sulphur of relatively elevated atmospheric temperatures, the process comprising substantially uniformly distributing through initially free-flowing and non-caking sulphur consisting predominantly of insoluble sulphur a material selected from the group consisting of turpentine, pine oil, pine tar and rosin in an amount less than about 5% of the weight of the insoluble surphur.

7. Finely divided solid sulphur containing sulphur substantially completely insoluble in carbon bisulphide as the predominant component thereof and a material selected from the group consisting of turpentine, pine oil, pine tar and rosin in an amount from about 0.1% to about 50% of the weight of the insoluble sulphur, said finely divided sulphur being free-flowing and non-caking prior to the addition of the material.

8. Finely divided solid sulphur containing sulphur substantially completely insoluble in carbon bisulphide as the predominant component thereof and a material selected from the group consisting of turpentine, pine oil, pine tar and rosin in an amount less than about 5% of the weight of the insoluble sulphur, said finely divided sulphur being free-flowing and non-caking prior to the addition of the material.

9. Finely divided solid sulphur containing sulphur substantially completely insoluble in carbon bisulphide as the predominant component thereof and a material selected from the group consisting of turpentine, pine oil, pine tar and rosin in an amount of only about 0.1% of the weight of the insoluble sulphur, said finely divided sulphur being free-flowing and non-caking prior to the addition of the material.

RAYMOND H. WALCOTT.
ALVIN SCHALLIS.

REFERENCES CITED

The following references are of record in the file of this patent:

UNITED STATES PATENTS

| Number | Name | Date |
|---|---|---|
| 1,908,619 | Wieder | May 9, 1933 |
| 2,019,443 | Christmann | Oct. 29, 1935 |